United States Patent [19]

Sakaue et al.

[11] Patent Number: 4,665,441
[45] Date of Patent: May 12, 1987

[54] METHOD AND SYSTEM FOR LINE-THINNING IN ELECTRONIC IMAGE PROCESSING

[75] Inventors: Yoshinori Sakaue, Tokyo; Kazutoshi Sugimoto, Wakoh, both of Japan

[73] Assignee: International Business Machines Corporation, Armonk, N.Y.

[21] Appl. No.: 777,973

[22] Filed: Sep. 19, 1985

[30] Foreign Application Priority Data

Sep. 21, 1984 [JP] Japan ............................... 59-197017

[51] Int. Cl.⁴ ....................... H04N 1/415; G06K 9/44
[52] U.S. Cl. ..................................... 358/280; 382/55; 358/260
[58] Field of Search .................... 358/280, 260; 382/55

[56] References Cited

U.S. PATENT DOCUMENTS

| | | | |
|---|---|---|---|
| 3,975,709 | 8/1976 | Beun ...................................... | 382/55 |
| 4,034,344 | 7/1977 | Saraga ................................... | 382/55 |
| 4,454,542 | 6/1984 | Miyazawa ........................... | 358/1C6 |
| 4,461,029 | 7/1984 | van Bilzem ........................... | 382/55 |

Primary Examiner—Howard W. Britton
Attorney, Agent, or Firm—Thomas P. Dowd

[57] ABSTRACT

To achieve high speed line-thinning, an electronic picture to be processed is divided into sections, and the scanning for line-thinning is performed for each section. If no point removal is performed in the scanning of a section, the line-thinning is completed for that section. When points are removed in the scanning, incomplete areas that require further line-thinning are determined based on positions where the points are removed. In the next scanning, scanning for line-thinning is not performed for all of the sections, but is done for areas within sections that contain the incomplete areas. These areas are smaller than the sections and are variably determined according to the size of their incomplete area. Thus, the area to be scanned is reduced and dynamically controlled. It is because the incomplete areas become smaller and smaller as the scanning is repeated, that the area variably determined according to the size of the incomplete area also becomes smaller. The condition to terminate all processes for line-thinning occurs when it is determined that the line-thinning is completed for all sections after checking all of them.

12 Claims, 18 Drawing Figures

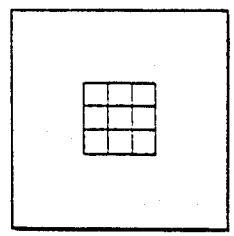
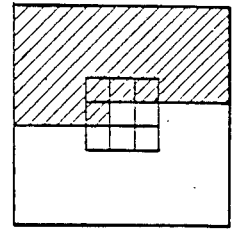
FIG. 9A    FIG. 9B
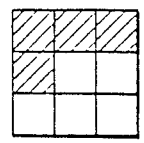
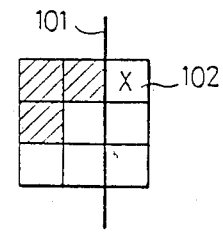
FIG. 10A    FIG. 10B
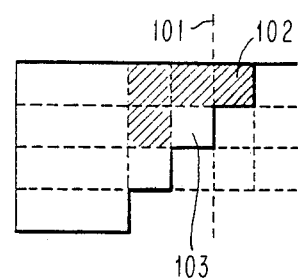
FIG. 11

METHOD AND SYSTEM FOR LINE-THINNING IN ELECTRONIC IMAGE PROCESSING

FIELD OF THE INVENTION

This invention relates to a line-thinning process for use with an electronic picture, and more particularly to a method and system for high speed line-thinning allowing minimum scanning of the image being processed.

BACKGROUND OF THE INVENTION

Line-thinning is a technique frequently used as a preprocessing procedure in electronic image processing, and various line-thinning processes have been developed up to now. Background information on these processes may be found in the articles, Tamura: "Comparative Study of Line-Thinning Schemes", *Material of IP Study Group of Information Processing Society of Japan* (1975-06) and Tamura: "Studies of Line-Thinning Schemes", *Material of PRL Study Group of the Institute of Electronics and Communication Engineers of Japan*, PRL 75-66, which compare and study line-thinning processes in general.

Particular techniques for line-thinning include sequential and parallel processes. Sequential line-thinning processes are described in, for example, the following material:

J. Hilditch: "Linear Skeleton from Square Cupboards", *In Machine Intelligence IV*, B. Meltzer and D. Michie, Eds. University Press, Edinburgh, pp. 403–420 (1969).

E. S. Duetsch: "Computer Similation of a Character-Recognition Machine, Part 1 ", *The Post Office Electrical Engineers J.* 60, pp. 39–44 (April, 1967); and Yokoi et al: "An Analysis of Topological Features at Digitized Binary Pictures using Local Features", *CG and IP*, Vol. 4, No. 1, pp. 63–73 (March, 1975).

Parallel line-thinning processes are indicated in, for example, the following material:

D. Rutoritz: "Pattern Recognition", *J. Royal Statist. Soc.* 129, Series A, pp. 504–430 (1966); and Tamura and Mori: "Agorithm and Connectivity of Parallel Line-Thinning of Binary Figures", *National Communication Conference in* 1974, No. 1539, p. 1390.

A further line-thinning method that processes a picture by segmenting it into a plurality of rectangular areas is disclosed in Japanese Laid-Open Patent Specification No. 163078/83.

The conventional line-thinning process has the following problems.

As will be seen from the line-thinning process of Hilditch, since one scanning for an entire picture reduces the width of lines in the picture by one pixel from each side, the number of scannings to be repeated for the entire picture is about W/2 where W is the maximum line width contained in the picture. This is illustrated in FIGS. 3A–3D. In this case, the number of scanning points P required for line-thinning is:

$$P = S \times \frac{W}{2}$$

where S is the number of scanning points in an entire picture($I \times J$);

W/2 is the repeated number of scannings of the entire picture; and

W is the maximum line width in the entire picture.

It will be seen that even if there is only one area with a thick line or a solid black area in the picture, it is required to repeatedly scan the entire picture because of such an area, which, will take an enormous amount of processing time.

Thus, to reduce the processing time, the previously-cited Japanese Laid-Open Patent Specification No. 163078/83 proposes to increase the speed of line-thinning by segmenting the picture into a plurality of rectangular areas so as to quickly complete the processing for the segmented areas without thick lines, and to repeatedly scan only the segmented areas with thick lines.

However, there still remains the problem that many unnecessary scannings are performed because, even in such segmented areas, the ratio of the lines to the overall area is often only a small percentage.

In addition, in the sequential line-thinning method of Hilditch, when the segmentation into rectangular areas is employed, each segmented area cannot be processed independently so to assure connectivity at a boundary. This means that each segmented area cannot be processed in parallel.

BRIEF DESCRIPTION OF THE DRAWINGS

FIG. 9A is a diagram showing a picture at the start of scanning.

FIG. 9B is a diagram showing the picture of FIG. 9A during point scanning.

FIG. 10A is a diagram showing the condition of 8-neighboring pixels in a section.

FIG. 10B is a diagram showing the condition of the 8-neighboring pixels of FIG. 10A, at a straight section boundary.

FIG. 11 is a diagram showing the condition of the 8-neighboring pixels at a stepwise section boundary.

SUMMARY OF THE INVENTION

Figure 1:
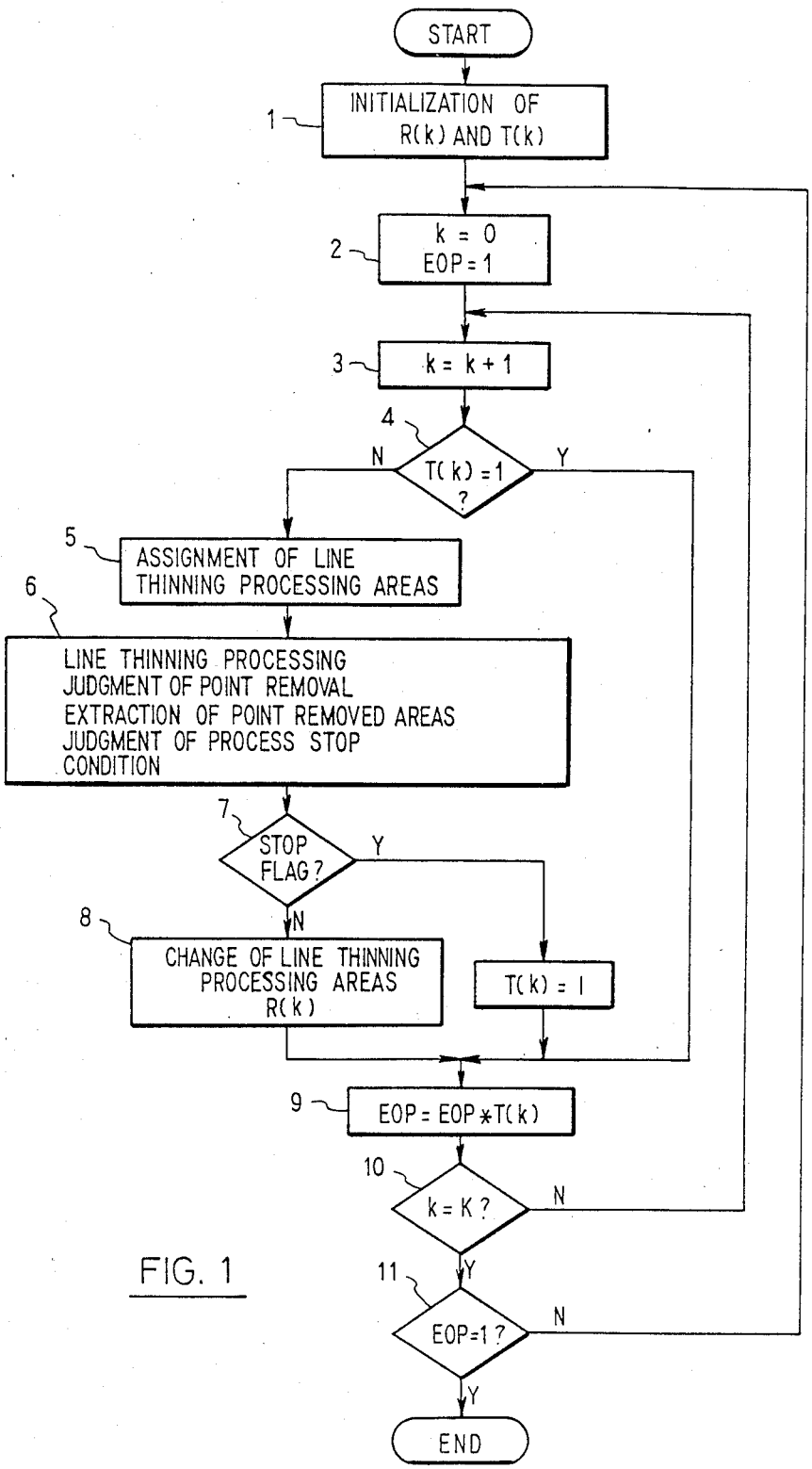
FIG. 1 is a flowchart showing an embodiment of the line-thinning method according to the invention.

It is an object of the present invention to provide a method and a system for high speed line-thinning that can minimize the number of scans.

To accomplish such high speed line-thinning, the invention divides a picture to be processed into a plurality of sections, and controls the line-thinning processing on the basis of said sections, that is, the scanning for line-thinning is performed for each section as required. When points are removed in the scanning, incomplete areas within a section that require further line-thinning are extracted based on the positions where the points are to be removed. On the other hand, if no point removal is performed during scanning of a section, the line-thinning is determined to be completed for that section. In the next overall scanning, scanning for line-thinning is not performed for all of the sections, but is done only for areas within the sections that contain the incomplete areas and which are smaller than the section and variably determined according to the incomplete areas. Thus, the invention reduces and controls dynamically the areas left to be scanned. It is because the incomplete areas become smaller and smaller as the scanning is repeated, that the scanned area, which is variably determined according to the incomplete area, also becomes smaller. The condition to terminate all processing for line-thinning occurs when it is determined that the line-thinning is completed for all sections after checking all of them.

In the case where the invention is applied to the sequential line-thinning method, the connectivity of lines can be easily assured by arranging the boundary between each section in a stepwise manner. Further, as each section in a stepwise manner can be processed independently, each section can be processed in parallel.

The high speed line-thinning method of the invention, is embodied in a high speed line-thinning system with the following arrangement. Firstly, information on a picture is stored electronically by a storage means, while information on line-thinning processing areas in each of the sections into which the picture is divided is managed by a processing area managing means. Information from this processing area managing means is supplied to an access controlling means, which then enables the accessing of the picture information of the line-thinning processing areas in the storage means. The accessed picture information is supplied to a line-thinning processing means. This processing means determines whether or not the point removal is performed, outputs information on whether or not further point removal is required, detects the positions where the points are removed if the point removal is performed, and supplies information on these positions to the processing area managing means. The information as to whether or not further point removal is required is supplied to a processing terminating control means. It controls the operation of the access controlling means. Timing between the access controlling means and the line-thinning processing means is controlled by a line-thinning processing control means.

PREFERRED EMBODIMENT OF THE INVENTION

Now, to understand the high speed line-thinning method according to the present invention, an embodiment in which the method is applied to sequential line-thinning will be described referring to FIGS. 4A to 4C.

In the embodiment, a picture is divided so as to have stepwise boundaries, which exemplifies a case where the high speed line-thinning method of the invention is embodied in combination with a method dividing a picture into sections with stepwise boundaries to easily assure connectivity in sequential line-thinning.

Figure 4A:
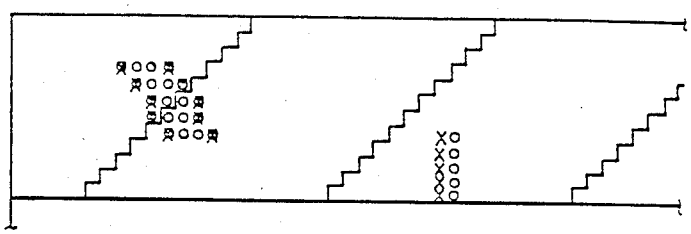
FIGS. 4A to 4C are diagrams showing changes of scanning areas in repeat scanning according to the invention.

Now, as shown in FIG. 4A, when first line-thinning scanning is performed for each of the three line-containing sections that are obtained by dividing a picture to be processed, it causes point removal positions marked with X and incomplete areas of line-thinning marked with O. These incomplete areas can be determined or defined based on the point removal positions. Thus, the incomplete areas are extracted using the appropriate point removal determinations. The first scanning is performed for the entire section so as to avoid missing any lines during scanning.

Figure 4B:
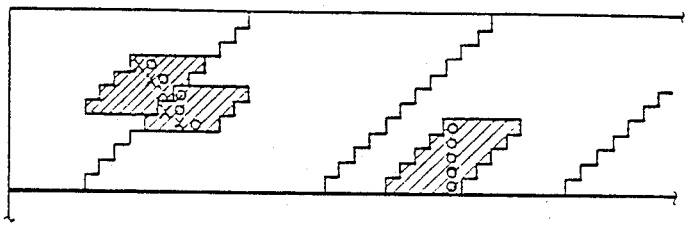

Then, as shown in FIG. 4B, second line-thinning scanning is performed for the shadowed areas, that are variably determined to be smaller than their containing sections according to the incomplete areas extracted in the first scanning, so that the shadowed areas contain these incomplete areas. Although the shadowed areas have shapes corresponding to the stepwise boundaries of the sections, they may have any other shape because the stepwise boundaries are merely caused by the processing program. The first and second sections contain point removal positions marked with X and imcomplete areas marked with O in the second scanning. Since no point is removed from the third section in the second scanning, the O marks do not indicate an incomplete area any more. Therefore, the line-thinning is completed for the third section.

Figure 4C:
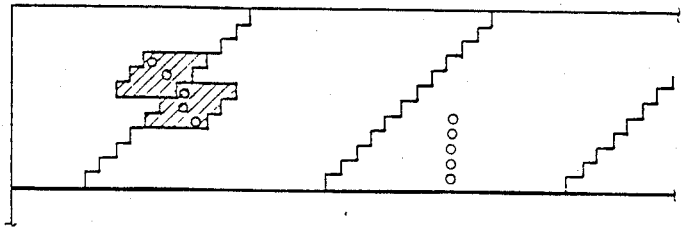

Then, as shown in FIG. 4C, a similar third line-thinning scanning is performed for the first and second sections. Since the incomplete areas extracted in the second scanning are smaller than those extracted in the first scanning, areas to be scanned by the third scanning become even smaller than those of the second scanning. As shown, the shadowed areas in FIG. 4C are smaller than those in FIG. 4B. Because no further point is removed from both sections in the third scanning, the line-thinning operation is completed for these three sections.

Similarly, the line-thinning operation continues for other sections of the picture with incomplete areas until point removal is no longer performed.

As clearly seen from the foregoing, the high speed line-thinning method according to the invention attains a minimum amount of scanning in the line-thinning process.

Figure 2:
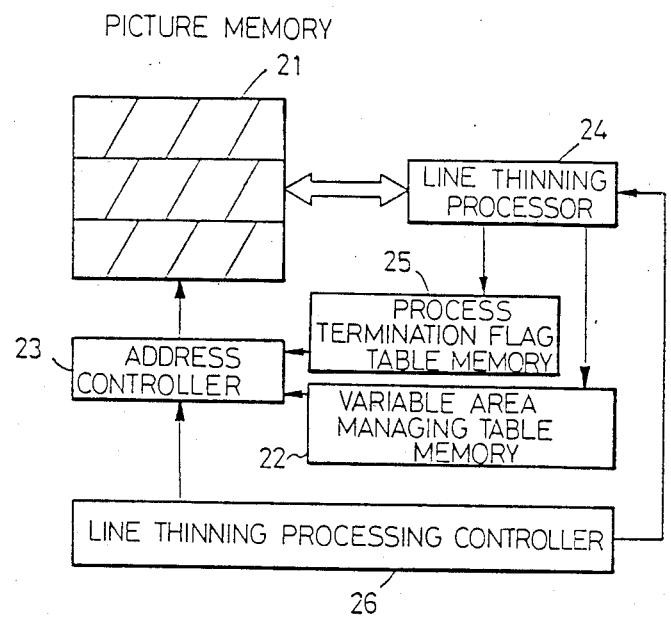
FIG. 2 is a block diagram showing an embodiment of a line-thinning system according to the invention.
Figures 3A, 3B, 3C, 3D:
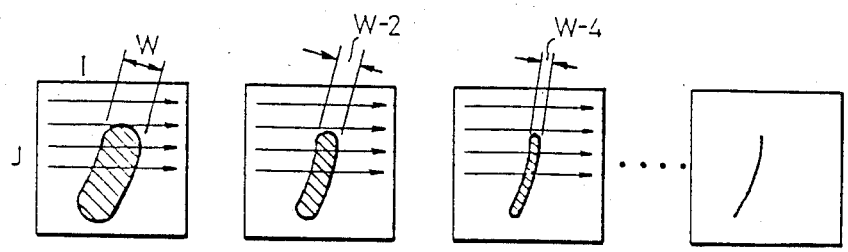
FIGS. 3A to 3D are diagrams showing changes of line width in line-thinning.

Now, a block diagram of a system embodying the invention is shown in FIG. 2.

A picture memory 21 with a size of I×J is divided into sections of, for example, m×n with stepwise boundaries. A variable area managing table memory 22 manages information of line-thinning processing areas for each of the sections. Based on the information of the table memory 22, an access controlling means in the form of an address controller 23 assigns an address for areas for which line-thinning conditions are judged. Picture information of the areas is supplied to a line-thinning processor 24. The processor 24 judges whether or not points are to be removed, writes in a process termination flag table memory 25 information on whether or not forth point removal is required, and, if points are removed, detects their positions, which are written into the variable area managing table memory 22. The address controller 23 operates according to an address managed by the variable area managing table menory 22 to continue the line-thinning process until the process termination flag on the section becomes 1. Line-thinning is not performed for areas for which the process termination flag becomes 1. When the process termination flag becomes 1 for all sections, the processing is terminated. Timing between the address controller 23 and the line-thinning processor 24 is controlled by the line-thinning processing controller 26.

A flowchart of the line-thinning operation will be described by referring to FIG. 1.

Figure 5:
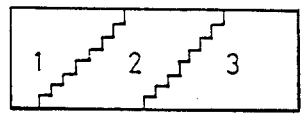
FIG. 5 is a diagram showing a type of division.

Step (1) initializes the area managing table R (k) of memory 22 and the process stop flag table T (k) of memory 25, and k is the number of sections into which the picture is divided. The area managing table R (k) contains information on start address, size and boundary information of areas to be sent to the line-thinning processor 24. In the case where the boundaries of sections are formed stepwise, it also contains information on a type of process for making the left and right ends of a section smooth (see FIG. 5). The process stop flag table T (k) is set at 0.

Step (2) sets k to 0 to execute the process for the first section area. Also, it sets a line-thinning process termination flag EOP at 1 that indicates whether or not all sections satisfy the stop condition.

Step (3) sets k to k +1 so that the process can transfer to the next area.

Step (4) checks whether or not the stop condition is satisfied for areas to be processed. If it is satisfied, the process skips to Step (9) without performing repeat scanning.

Step (5) assigns the line-thinning processing areas. It is attained by using the area managing table R (k).

Figure 6:
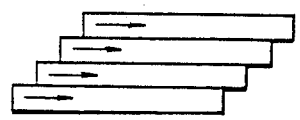
FIG. 6 is a diagram showing scanning of a mask.
Figure 7:
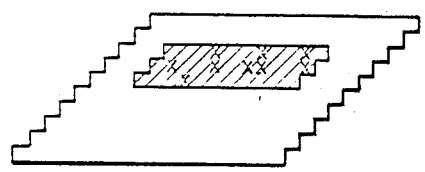
FIG. 7 is a diagram showing an area from which points are removed.

Step (6) performs the line-thinning process. In the case where sequential line-thinning is employed, the point removal condition and the process stop condition are determined by scanning a mask of 3×3. The scanning of the mask is performed within the stepwise boundaries of sections (see FIG. 6). Areas from which the points are removed are detected by determining the first and last lines and the first and last columns from which the points are removed in the scanning (see FIG. 7). In FIG. 7, X indicates a point removal position, while the shadowed area indicates an incomplete area from which the points are removed.

Step (7) judges the process stop flag. If it satisfies the process stop condition, T(k) is set at 1.

If not, Step (8) changes the line-thinning process area. More specifically, if the process stop condition is not satisfied, an area from which the points detected during the point scanning are removed is set as an area for the next repeat scanning. The area managing table R (k) is rewritten at this moment.

Step (9) performs an AND operation for the line-thinning termination flag EOP and the process stop flag T (k).

Step (10) judges whether or not the scanning for the entire picture is completed. If the scanning for the entire picture is not completed, the process returns to Step (3).

Step (11) checks the line-thinning termination flag EOP. If the stop condition is satisfied for all sections, the line-thinning is terminated at that moment.

The following consideration will show that the time for line-thinning can be reduced by dynamically reducing and controlling areas for repeat scanning.

When the picture is not divided at all, as shown by the equation (1), the number of scanning points required for the line-thinning P1 is:

$$P1 = S x \frac{W}{2} \quad [2]$$

When the picture is divided into K sections, because the number of repeat scannings required for line-thinning each section is determined by the maximum line line width in the section, the number of scanning points required for the line-thinning is:

$$P2 = \sum_{k=1}^{K} s_k \times \frac{w_k}{2} \quad [3]$$

where $s_k$ is the size of section (k);

$$\frac{w_k}{2}$$

is the number of repeat scannings for section (k); and $w_k$ is the maximum line width in section (k).

Since there is a relationship of $0 \leq w_k \leq W$ between W and $w_k$, P2 is not affected by the maximum line width in the entire picture, and the number of scanning points is reduced in comparison to a case where the picture is not divided for scanning.

When it is intended to make the object of repeat scanning into a dynamically reducing variable area including incomplete areas requiring line-thinning in addition to division of the picture, the number of scanning points required for line-thinning is:

$$P3 = \sum_{k=1}^{K} \sum_{n=1}^{w_k/2} s_{kn} \quad [4]$$

where $s_{kn}$ is the size of the incomplete area in each repeat scanning (n).

If the size of the scanning area does not change for each repeat scanning, P3 becomes equal to P2. However, since generally, or in many cases, lines contained in a section occupy only a few percent of the section, $P3 \leq P2$. Thus, the following relation is established:

$$P3 \leq P2 \leq P1 \quad [5]$$

By making the object of repeat scanning into a dynamically reducing and varying area containing the incomplete areas requiring line-thinning as described, it becomes possible to reduce the number of scanning points for line-thinning and to to shorten the processing time.

Figure 8:
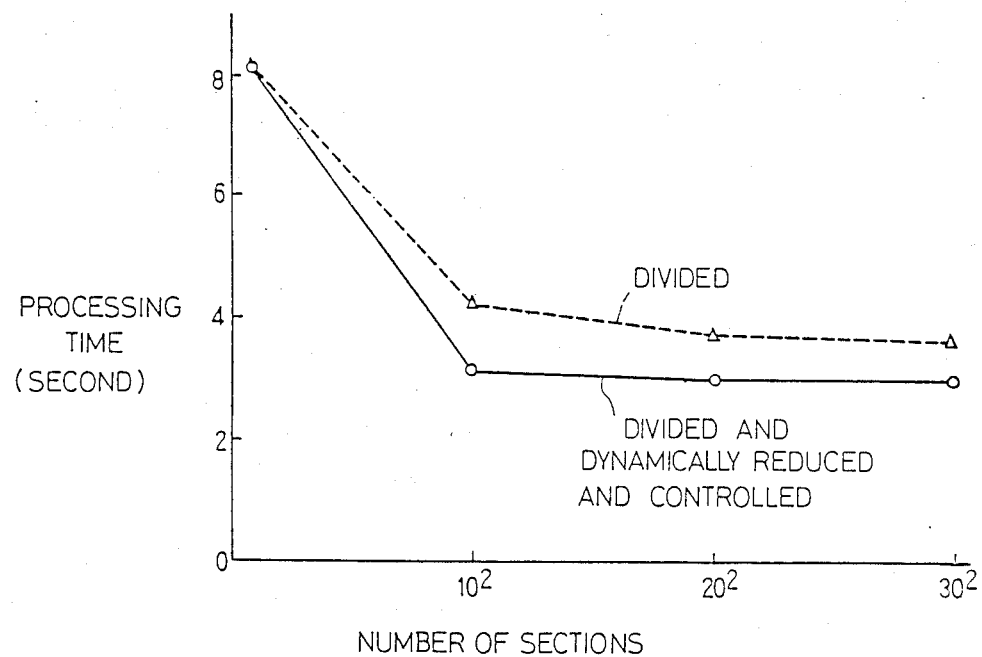
FIG. 8 is a graph showing line-thinning processing times for a case where a picture is merely divided, and for a case where a picture is divided and areas to be repeatedly scanned are dynamically reduced and controlled according to the invention.

Therefore, this invention allows significant shortening of the time for line-thinning. In fact, when the processing time was investigated for a map that was a complicated picture, the processing time could be reduced by 20%, as shown in FIG. 8, for a case where the picture was divided and the areas to be repeatedly scanned were dynamically reduced and controlled (solid line), as compared to a case where the picture was only divided (broken line). There arose minimal overhead in each case.

Now the advantage obtained by dividing the picture stepwise will be described.

In the sequential line-thinning, such as by Hilditch, the picture is scanned by a mask of 3×3 (pixels) to determine, based on the condition of the 8-neighboring pixels, wherther or not a point of the object of scanning (at the center of the mask) should be removed. In this case, the condition of the 8-neighbors is determined from both the condition of the picture at the starting of the scanning and the condition of the picture during scanning for each point (see FIGS. 9A and 9B). FIG. 9A is an original picture at the starting of repeat scanning, while FIG. 9B is a picture during scanning of points for consideration of point removal, the shadowed areas of which are those already scanned, considered, and processed.

Since as the mask moves over the picture four neighboring points or pixels have already been scanned and processed for removal, as indicated by the shadowed areas in FIG. 10A, if, when determining the condition of 8-neighboring pixels during the point scanning the picture is simply divided orthogonally, that is, by a grid extending in the horizontal and vertical directions a non-processed area 102 results at the section boundary 101 as shown in FIG. 10B. However, if the picture is divided stepwisely as shown in FIG. 11, the non-processed area 102 becomes processed in the prior scan and thus will not introduce an error in the consideration of area 103. This allows the mask to perform exactly the same processing as that in a case where no division of the picture is performed, and assures the continuity of lines. In addition, it can improve the line-thinning processing time because there is no need for useless overlapping of scanning in the sections of the picture for assuring the continuity of lines.

In the case where the picture is divided into a grid of rectangles without a stepwise boundary, the line-thinning processing is carried out for areas with the overlapping of several pixels, and additional processing is performed for the boundary in order to assure the continuity of lines. In such case, it is required to prepare a separate buffer for the line-thinning into which data are transferred before the line-thinning processing. This requires very large overhead to achieve the division of the picture, which, in turn, eliminates the advantage of division. On the other hand, in the case where the picture is stepwisely divided, it is possible to improve the processing time addresses in a buffer for an original picture can be directly specified without the need for the use of such a separate buffer.

The present invention may be implemented on a general-purpose computer, such as the IBM System 370.

Having thus described my invention, what I claim as new and desire to secure as Letters Patent is:

1. A method for thinning the lines in an electronic picture using variable scanning areas comprising the steps of:
   dividing said picture into sections to be scanned;
   performing scanning for line-thinning on each of said sections and removing points from line-containing areas in said sections that require line-thinning;
   determining, during said scanning, areas of incomplete line-thinning in each of said sections based on point-to-be-removed positions in said sections;
   discontinuing the scanning of a section if said point-to-be-removed positions are determined to be completed during a scanning thereof;
   continuing scanning over variable areas in sections still including said incomplete line-thinning areas in such manner that the extent of the scanning is reduced in accordance with the sizes of said variable areas being scanned, the scanned areas becoming smaller than the areas of their respective containing sections and decreasing in extent during each successive scan according to the size and location of said incomplete line-thinning areas; and
   repeating the scaning until line thinning is discontinued in all of said sections.

2. A method as in claim 1 wherein before discontinuing scanning all of said sections are checked for areas that require further line thinning.

3. A method as claimed in claim 1, wherein said picture is divided into a plurality of sections with boundaries in the form of steps.

4. A method as in claim 3 wherein the sections of said picture are processed in parallel.

5. A system for thinning lines in electronic pictures using variable scanning areas comprising:
   a storage means for storing information on said picture and dividing said picture into sections for scanning:
   a processing area managing means for managing information on line-thinning processing areas in said sections;
   an access controlling means for receiving the information from said area managing means, and enabling the accessing of the picture information on said line-thinning processing areas in said storage means;
   a line-thinning processing means for receiving said accessed picture information and comprising:
      scanning means for removing points from said processing areas of said picture for line-thinning;
      means for determining whether or not points have been removed, from a section;
      means for outputting information as to whether or not further point removal is required from a section; and
      means for detecting point removed positions in a section and providing information on said positions to said processing area managing means;
   a processing terminating control means for controlling operation of said access controlling means in response to information from said outputting means as to whether or not further point removal is required;
   a line-thinning processing control means for controlling the timing of said access controlling means and said line-thinning processing means;
   and wherein,
   said processing area managing means comprises means for determining from said point removed position information the line-thinning processing areas in a section that require further line-thinning;
   means for reducing the size of the area being scanned for further line-thinning in a section based on said point removed position information, and
   means for repeating said line-thinning and scanned area size reducing until said processing terminating control means ceases the operation of said access controlling means in response to information from said outputting means.

6. A system as in claim 5 further comprising means for checking all of said sections for areas that require further line thinning before discontinuing scanning.

7. A system as in claim 5 wherein said processing area managing means comprises a variable area managing table memory.

8. A system as in claim 5 wherein said access controlling means comprises an address controller.

9. A system as in claim 5 wherein the boundaries of said sections are in stepped form and said scanning means comprises means for scanning said processing areas in stepped form.

10. A system as in claim 9 further comprising means for processing the sections of said picture in parallel.

11. A system as in claim 5 wherein said processing terminating control means comprises a process termination flag table memory.

12. A system as in claim 11 wherein said processing terminating control means ceases the operation of said access controlling means when the process termination flag of said process termination flag table memory becomes 1.

* * * * *